United States Patent
D'Penha (10) Patent No.: US 9,213,695 B2
(45) Date of Patent: Dec. 15, 2015

(54) BRIDGE FROM MACHINE LANGUAGE INTERPRETATION TO HUMAN LANGUAGE INTERPRETATION

(75) Inventor: Lindsay D'Penha, Salinas, CA (US)

(73) Assignee: Language Line Services, Inc., Monterey, CA (US)

(*) Notice: Subject to any disclaimer, the term of this patent is extended or adjusted under 35 U.S.C. 154(b) by 406 days.

(21) Appl. No.: 13/367,233

(22) Filed: Feb. 6, 2012

(65) Prior Publication Data

US 2013/0204604 A1 Aug. 8, 2013

(51) Int. Cl.
*G06F 17/28* (2006.01)

(52) U.S. Cl.
CPC .................................... *G06F 17/289* (2013.01)

(58) Field of Classification Search
CPC ... G06F 17/28; G06F 17/2854; G06F 17/289; G06F 17/2836
USPC ................ 704/2, 3, 8, 277; 379/88.05, 88.06, 379/265.12
See application file for complete search history.

(56) References Cited

U.S. PATENT DOCUMENTS

| | | | |
|---|---|---|---|
| 5,392,343 A | 2/1995 | Davitt | |
| 5,408,410 A * | 4/1995 | Kaji | G06F 17/271 704/2 |
| 6,985,850 B1 | 1/2006 | Scanlan | |
| 7,466,801 B2 * | 12/2008 | Miller et al. | 379/88.06 |
| 7,587,307 B2 * | 9/2009 | Cancedda | G06F 17/28 704/2 |
| 7,792,676 B2 * | 9/2010 | Klinefelter et al. | 704/271 |
| 7,962,345 B2 * | 6/2011 | Liqin et al. | 704/277 |
| 8,032,372 B1 * | 10/2011 | Zimmerman | G06F 17/2818 704/2 |
| 8,326,598 B1 * | 12/2012 | Macherey et al. | 704/4 |
| 8,457,947 B2 * | 6/2013 | Yang et al. | 704/4 |
| 8,842,821 B2 * | 9/2014 | Kelly et al. | 379/265.12 |
| 8,843,359 B2 * | 9/2014 | Lauder | 704/4 |
| 2002/0087301 A1 * | 7/2002 | Jones | G06F 17/2872 704/2 |
| 2002/0169592 A1 | 11/2002 | Aityan | |
| 2004/0218751 A1 * | 11/2004 | Colson et al. | 379/265.09 |
| 2004/0264677 A1 | 12/2004 | Horvitz | |
| 2005/0076342 A1 * | 4/2005 | Levins et al. | 719/313 |
| 2005/0246156 A1 * | 11/2005 | Scanlan | 704/2 |
| 2006/0265223 A1 * | 11/2006 | Doyle | G10L 15/20 704/231 |
| 2007/0064915 A1 * | 3/2007 | Moore et al. | 379/265.12 |
| 2007/0064916 A1 * | 3/2007 | Moore et al. | 379/265.12 |
| 2007/0150259 A1 * | 6/2007 | Akahane et al. | 704/2 |
| 2007/0294076 A1 * | 12/2007 | Shore et al. | 704/2 |
| 2008/0133245 A1 * | 6/2008 | Proulx et al. | 704/277 |
| 2008/0215309 A1 * | 9/2008 | Weischedel et al. | 704/3 |
| 2008/0300860 A1 | 12/2008 | Marlow | |
| 2009/0089042 A1 | 4/2009 | Wald et al. | |
| 2009/0119091 A1 | 5/2009 | Sarig | |
| 2009/0132230 A1 * | 5/2009 | Kanevsky | G06F 17/289 704/2 |

(Continued)

*Primary Examiner* — Martin Lerner
(74) *Attorney, Agent, or Firm* — Patent Ingenuity, P.C.; Samuel K. Simpson (57) ABSTRACT

A language interpretation system receives a request for an interpretation of a voice communication between a first language and a second language. Further, the language interpretation system provides the request to a machine language interpreter. In addition, the machine language interpreter provides live language interpretation of the voice communication. The live language interpretation of the voice communication is halted by the machine language interpreter in real time during the live language interpretation based upon a criteria being met. Further, the voice communication is transitioned to a human language interpreter to resume the live language interpretation of the voice communication after the machine language interpreter is halted.

8 Claims, 7 Drawing Sheets

(56) References Cited

U.S. PATENT DOCUMENTS

| | | | |
|---|---|---|---|
| 2009/0265175 A1 | 10/2009 | Fang | |
| 2009/0313006 A1* | 12/2009 | Tang | 704/2 |
| 2010/0094616 A1* | 4/2010 | Woodring | 704/2 |
| 2010/0121629 A1* | 5/2010 | Cohen | G06F 17/28 704/2 |
| 2010/0198580 A1 | 8/2010 | Klinefelter | |
| 2010/0223048 A1 | 9/2010 | Lauder | |
| 2011/0066645 A1* | 3/2011 | Cooper et al. | 707/770 |
| 2011/0077933 A1 | 3/2011 | Miyamoto | |
| 2011/0082683 A1* | 4/2011 | Soricut et al. | 704/2 |
| 2011/0082684 A1* | 4/2011 | Soricut et al. | 704/2 |
| 2011/0209038 A1 | 8/2011 | Travieso | |
| 2011/0225104 A1 | 9/2011 | Soricut | |
| 2012/0109626 A1* | 5/2012 | Yassa | G06F 17/2854 704/2 |
| 2012/0240039 A1* | 9/2012 | Walker | G06Q 10/10 704/2 |
| 2012/0284015 A1* | 11/2012 | Drewes | G06F 17/2854 704/3 |
| 2012/0303352 A1* | 11/2012 | Coen | G06F 17/2854 704/2 |
| 2013/0090915 A1* | 4/2013 | Clark | 704/2 |
| 2013/0262079 A1* | 10/2013 | D'Penha | G06F 17/289 704/3 |
| 2014/0142917 A1* | 5/2014 | D'Penha | G06F 17/2836 704/2 |

* cited by examiner

BRIDGE FROM MACHINE LANGUAGE INTERPRETATION TO HUMAN LANGUAGE INTERPRETATION

BACKGROUND

1. Field

This disclosure generally relates to the field of language interpretation. More particularly, the disclosure relates to machine language interpretation and human language interpretation.

2. General Background

The language interpretation industry continues to grow with the increasing demand for language interpretation. Language interpretation provides assistance to a variety of fields. For example, live language interpretation reduces the risk of errors resulting from language barriers in public safety for first responders for police, ambulance service, hospitals, and disaster relief efforts.

Recent developments have led to machine language interpretation such that a customer may receive language interpretation from an automated system. Such machine language interpretation may help reduce the personnel costs of a language interpretation system provider. For example, the language interpretation system provider may avoid many of the costs of hiring, training, and employing human language interpreters. However, such machine language interpretation is still at the early stages of development. As a result, current machine language interpretation systems may not be providing a satisfactory language interpretation experience for many customers.

SUMMARY

In one aspect of the disclosure, a process is provided. The process receives, at a language interpretation system, a request for an interpretation of a voice communication between a first language and a second language. Further, the process provides, at the language interpretation system, the request to a machine language interpreter. In addition, the process provides, with the machine language interpreter, live language interpretation of the voice communication. The process also halts the live language interpretation of the voice communication by the machine language interpreter in real time during the live language interpretation based upon a criteria being met. Further, the process transitions the voice communication to a human language interpreter to resume the live language interpretation of the voice communication after the machine language interpreter is halted.

In another aspect of the disclosure, a computer program product is provided. The computer program product comprises a computer useable medium having a computer readable program. The computer readable program when executed on a computer causes the computer to receive, at a language interpretation system, a request for an interpretation of a voice communication between a first language and a second language. Further, the computer readable program when executed on the computer causes the computer to provide, at the language interpretation system, the request to a machine language interpreter. In addition, the computer readable program when executed on the computer causes the computer to provide, with the machine language interpreter, live language interpretation of the voice communication. The computer readable program when executed on the computer also causes the computer to halt the live language interpretation of the voice communication by the machine language interpreter in real time during the live language interpretation based upon a criteria being met.

In another aspect of the disclosure, a system is provided. The system includes a reception module that receives a request for an interpretation of a voice communication between a first language and a second language. Further, the system includes a routing module. In addition, the system includes a machine language interpreter that receives the request from the routing module and provides live language interpretation of the voice communication. The system also includes a processor that halts the live language interpretation of the voice communication by the machine language interpreter in real time during the live language interpretation based upon a criteria being met and transitions the voice communication to a human language interpreter to resume the live language interpretation of the voice communication after the machine language interpreter is halted.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIGS. 3A-3C illustrate a variety of different criteria that may be utilized to provide a transition from the machine language interpreter to the human language interpreter.

DETAILED DESCRIPTION

A method, computer program product, apparatus, and system are provided for a bridge from a machine language interpreter to a human language interpreter. In one embodiment, the bridge is a routing system that transitions a voice communication from the machine language interpreter to the human language interpreter. The transitioning may be effectuated based upon a criteria being met. For example, a customer may provide a direct prompt or request to be switched from the machine language interpreter to a human language interpreter. The input may be effectuated by a press of a button on a phone, keyboard, or the like. As another example, the machine language interpreter may utilize its own logic to determine that human help is needed. As another example, the machine language interpreter may utilize a predetermined threshold to figure out that a switch should be performed to a human interpreter. The predetermined threshold may be based on a quantity of times that a customer has to provide information.

Figure 1:
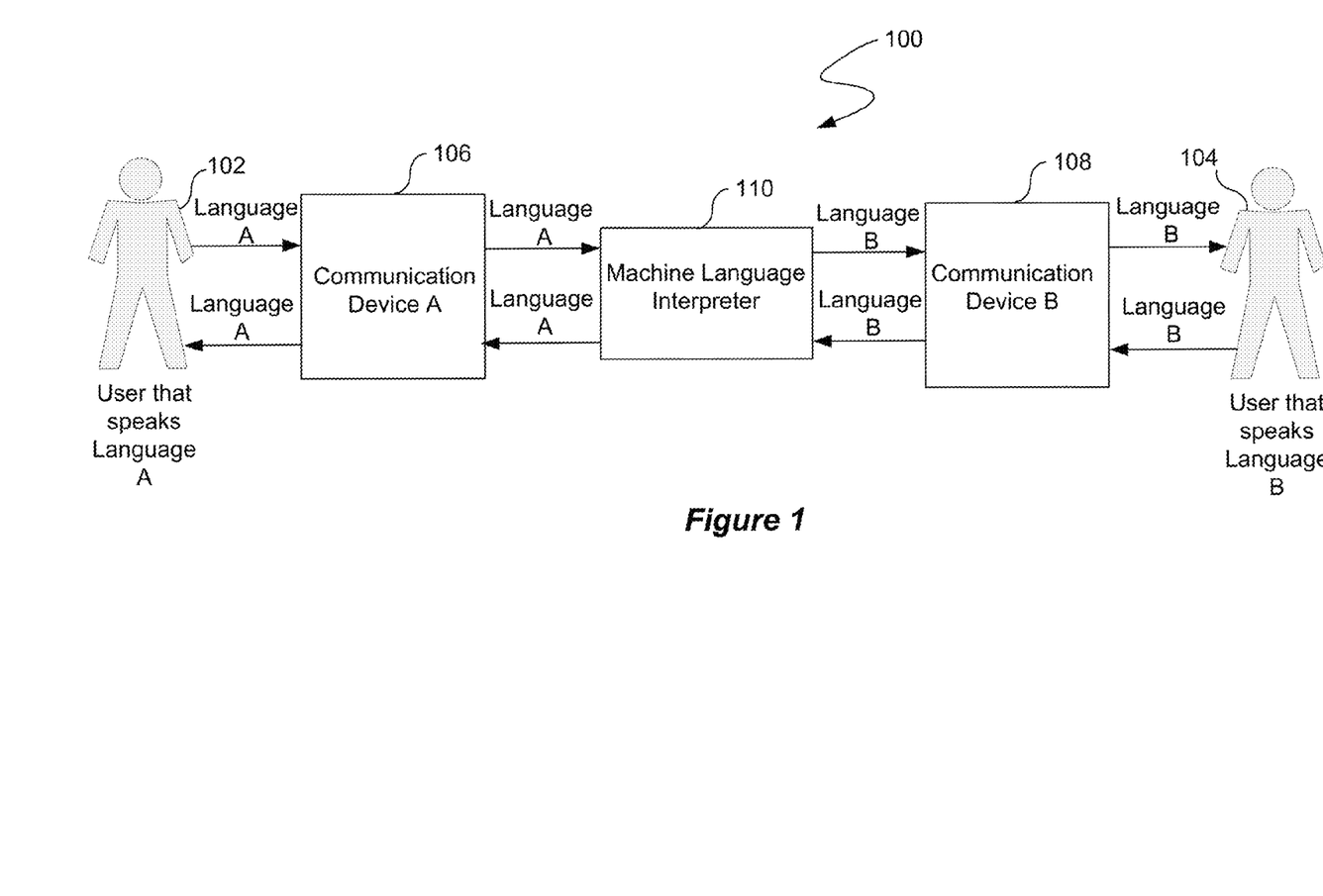
FIG. 1 illustrates a language interpretation system that may be utilized to provide a machine language interpretation service.

FIG. 1 illustrates a language interpretation system 100 that may be utilized to provide a machine language interpretation service. As an example, a user 102 that speaks language A may wish to converse with a user 104 that speaks language B. In one embodiment, the users may utilize communication devices. For example, the user 102 that speaks language A may utilize a communication device A 106. Further, as an example, the user 104 that speaks language B may utilize a communication device B 108. A communication device as provided for herein may be a telephone, smart phone, cell phone, tablet device, personal computer ("PC"), laptop, notebook, or the like. The users may utilize their respective communication devices to connect to a machine language interpreter 110. The users may connect through a network such as a public switch telephone network ("PSTN"), Internet, local area network ("LAN"), wide area network ("WAN"), Ethernet connection, wireless network, or the like. In one embodiment, the users transmit voice messages to one another through their respective communication devices. Further, in one embodiment, the voice communications are spoken by the user. In an alternative embodiment, the voice communications are interpreted from textual input from the users to voice communications.

The machine language interpreter 110 interprets the voice communication according to the desired language for the users. For example, the machine language interpreter 110 may interpret the voice communication from language A from the user 102 that speaks language A into language B for the user 104 that speaks language B. Further, the machine language interpreter 110 may interpret the voice communication from language B from the user 104 that speaks language B into language A for the user 102 that speaks language A. In one embodiment, the machine language interpreter 110 is automated. In other words, the machine language interpreter 110 may operate without manual intervention. For example, the machine language interpreter 110 may receive the voice communications and automatically provide language interpretation for the voice communications. The machine language interpreter 110 may be a hardware device. Alternatively, the machine language interpreter 110 may be a set of computer implemented instructions residing on a computing device. In yet another alternative, the machine language interpreter 110 is a combination of a hardware device and a set of computer implemented instructions residing on the hardware device. With any of the configurations provided for herein, a hardware processor may be utilized to implement the machine language interpreter 110.

Figure 2:
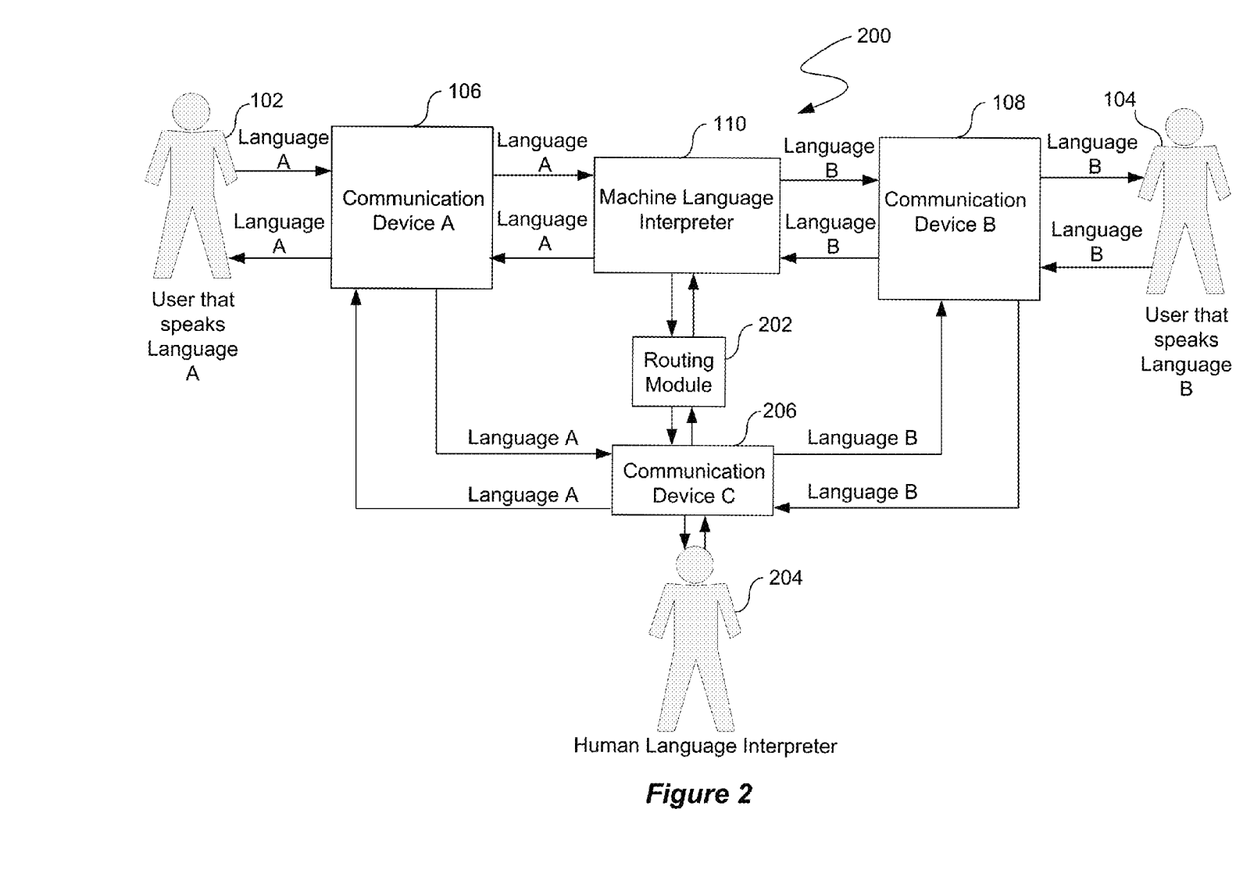
FIG. 2 illustrates a language interpretation system that may be utilized to provide a bridge between a machine language interpretation service and a human language interpretation service.

FIG. 2 illustrates language interpretation system 200 that may be utilized to provide a bridge between a machine language interpretation service and a human language interpretation service. As an example, a routing module 202 may act as the bridge. The routing module 202 may transition a voice communication between the user 102 that speaks language A and the user 104 that speaks language B from the machine language interpreter 110 to a human language interpreter 204. In one embodiment, the human language interpreter 204 utilizes a communication device C 206 to provide the language interpretation for the voice communication. In one embodiment, the live language interpretation of the voice communication by the machine language interpreter 110 is halted in real time during the live language interpretation based upon a criteria being met. As an example, the routing module 202 may halt the machine language interpreter 110. As another example, a processor may halt the machine language interpreter 110. In one embodiment, the machine language interpreter 110 is halted in real time during the voice communication. In other words, the halting of the machine language interpreter 110 does not have to wait until the language interpretation by the machine language interpreter 110 is completed. As a result, if the criteria is met, a customer does not have to wait long to be connected to the human language interpreter 204. The user may be immediately connected to the human language interpreter 204 in real-time.

With any of the configurations described herein, data may be provided from the machine language interpreter 110 to the human language interpreter 204 to assist the human language interpreter 110. For example, the human language interpreter 204 may obtain access to data from the machine language interpreter session such as the interpretation that has occurred so far, information about the customer obtained by the machine language interpreter, or the like. By being able to obtain the interpretation performed by the machine language interpreter 110 so far, the human language interpreter 204 may resume from the place in the interpretation where the machine language interpreter 110 left off. Alternatively, the human language interpreter 204 may resume from an earlier place in the interpretation. For example, if the machine language interpreter 110 was interpreting satisfactorily for a duration, but unsatisfactorily for a subsequent duration, the human language interpreter 204 may continue interpreting from the beginning of the subsequent duration. As yet another alternative, the human language interpreter 110 may begin interpreting from a place in the interpretation determined by the users.

Figure 3A:
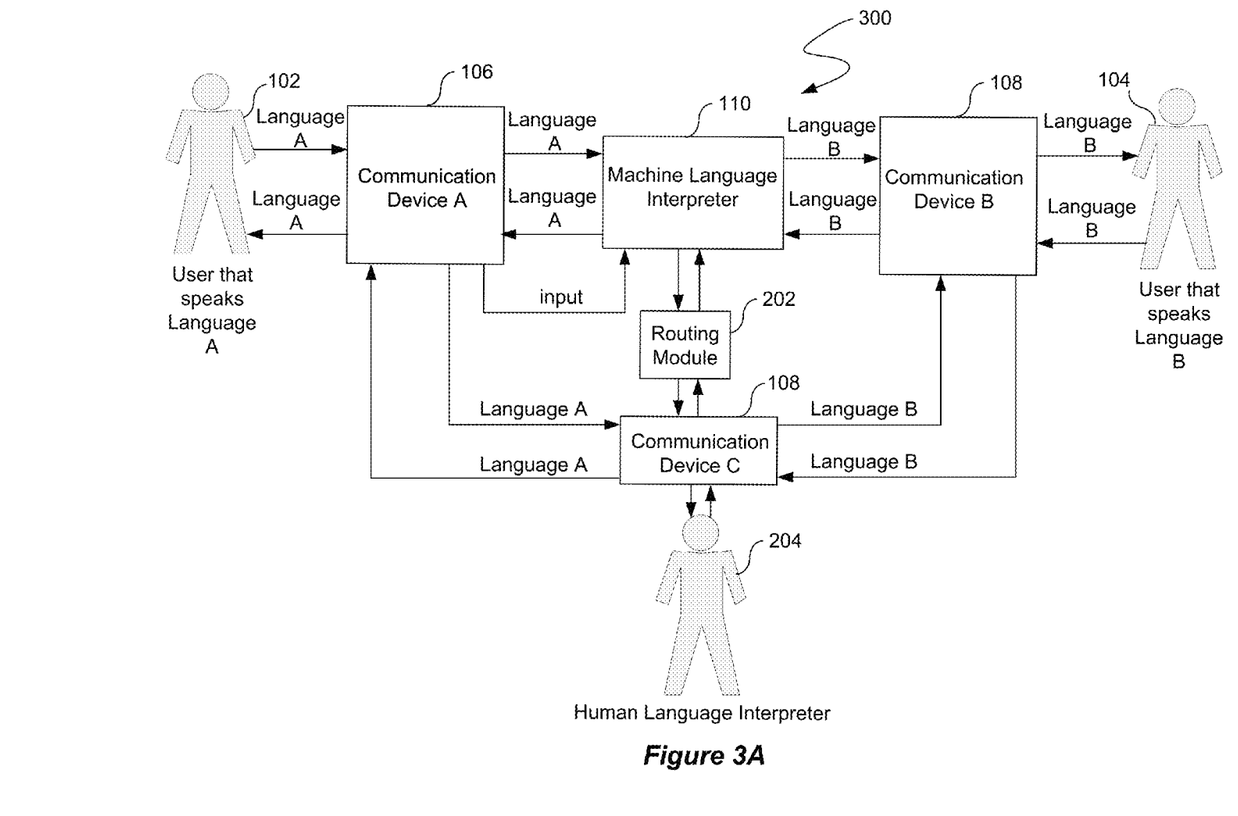
FIG. 3A illustrates configuration with a direct input criteria that may be utilized by a user to directly request a transition from the machine language interpreter to the human language interpreter.
Figure 3B:
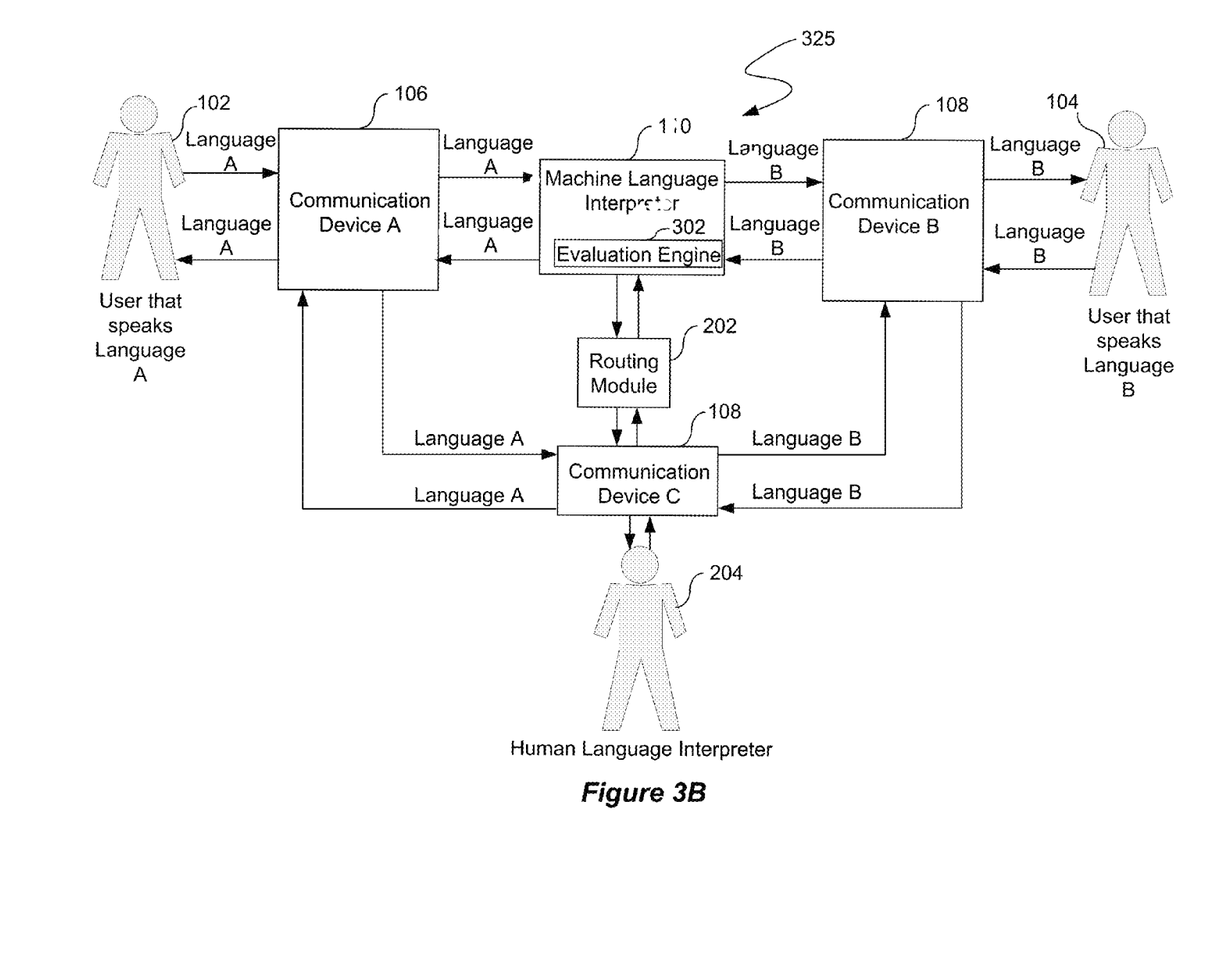
FIG. 3B illustrates a configuration with an evaluation engine that may be utilized by the machine language interpreter to perform an evaluation as to whether the voice communication should be transitioned to the human language interpreter.
Figure 3C:
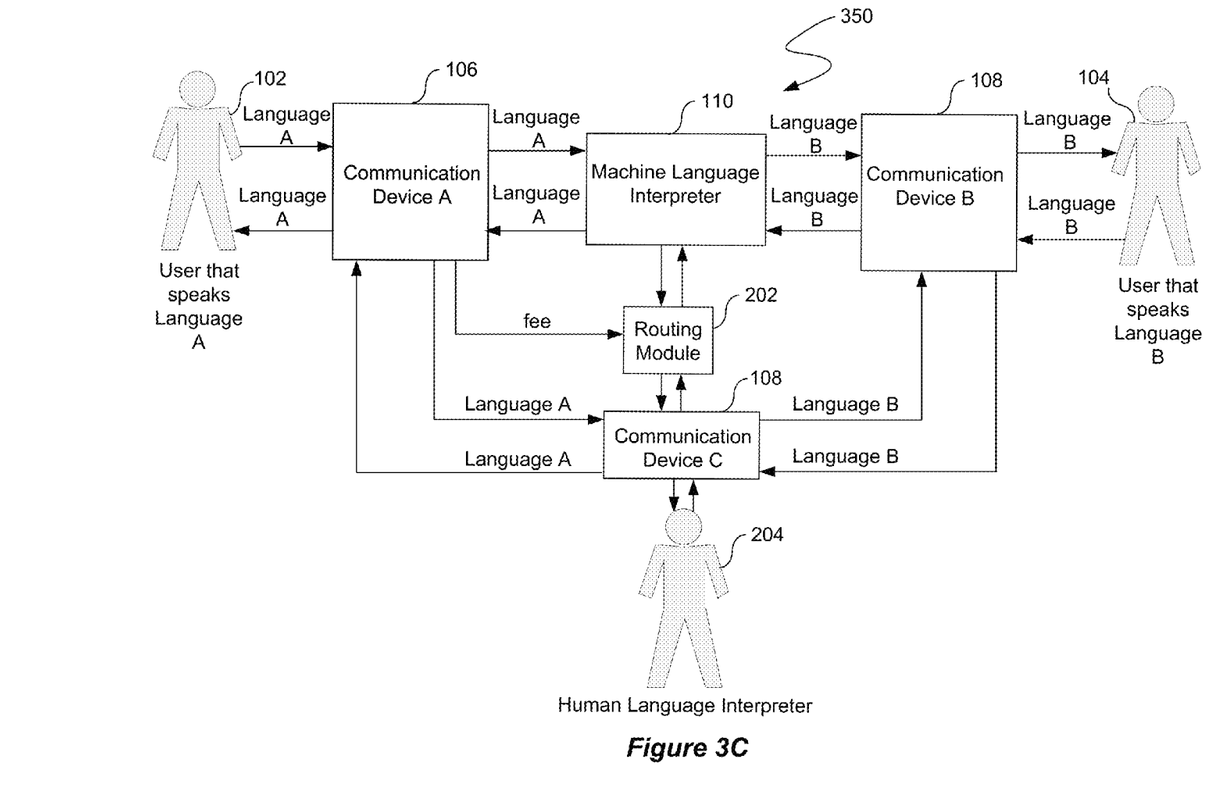
FIG. 3C illustrates a configuration that is fee based.

FIGS. 3A-3C illustrate a variety of different criteria that may be utilized to provide a transition from the machine language interpreter 110 to the human language interpreter 204. FIG. 3A illustrates configuration 300 with a direct input criteria that may be utilized by a user to directly request a transition from the machine language interpreter 110 to the human language interpreter 204. The direct input may be a touch of a key, a voice command, or the like. In one embodiment, the direct input is provided from a communication device such as the communication device A 106 to the machine language interpreter 110. The machine language interpreter 110 may then provide the voice communication to the routing module 202, which may then send the voice communication to the communication device C 108 for language interpretation by the human language interpreter 204. In another embodiment, the direct input is provided from a communication device such as the communication device A 106 to the routing module 202, which may then send the voice communication to the communication device C 108 for language interpretation by the human language interpreter 204.

FIG. 3B illustrates a configuration 325 with an evaluation engine 327 that may be utilized by the machine language interpreter 110 to perform an evaluation as to whether the voice communication should be transitioned to the human language interpreter 204. For example, the evaluation engine 302 may determine that a predetermined threshold of requests by the user for language interpretation has been surpassed. As an example, the requests may be for another interpretation. Accordingly, the evaluation engine 302 may determine that the user is not content with the language interpretation being performed by the machine language interpreter 110 and may determine to initiate a transition of the voice communication to the human language interpreter 204. Other criteria may be utilized by the evaluation engine 302 to determine if a transition of the voice communication from the machine language interpreter 110 to the human language interpreter 204 should be performed.

FIG. 3C illustrates a configuration 350 that is fee based. A user may be able to receive language interpretation from the machine language interpreter 110 at no fee or at a reduced fee. If the user would prefer to instead receive language interpretation from the human language interpreter 204, the user may have to pay a fee or an increased fee. In one embodiment, the user may pay the fee or the increased fee before the language interpretation by the machine language interpreter 110 begins to avoid any language interpretation by the machine language interpreter 110. In another embodiment, the user begins receiving interpretation from the machine language interpreter 110 and then transitions to the human language interpreter 204 during the language interpretation after the user pays the fee or the reduced fee. As an example, the fee may be provided to the routing module 202. However, other configurations are possible.

Figure 4:
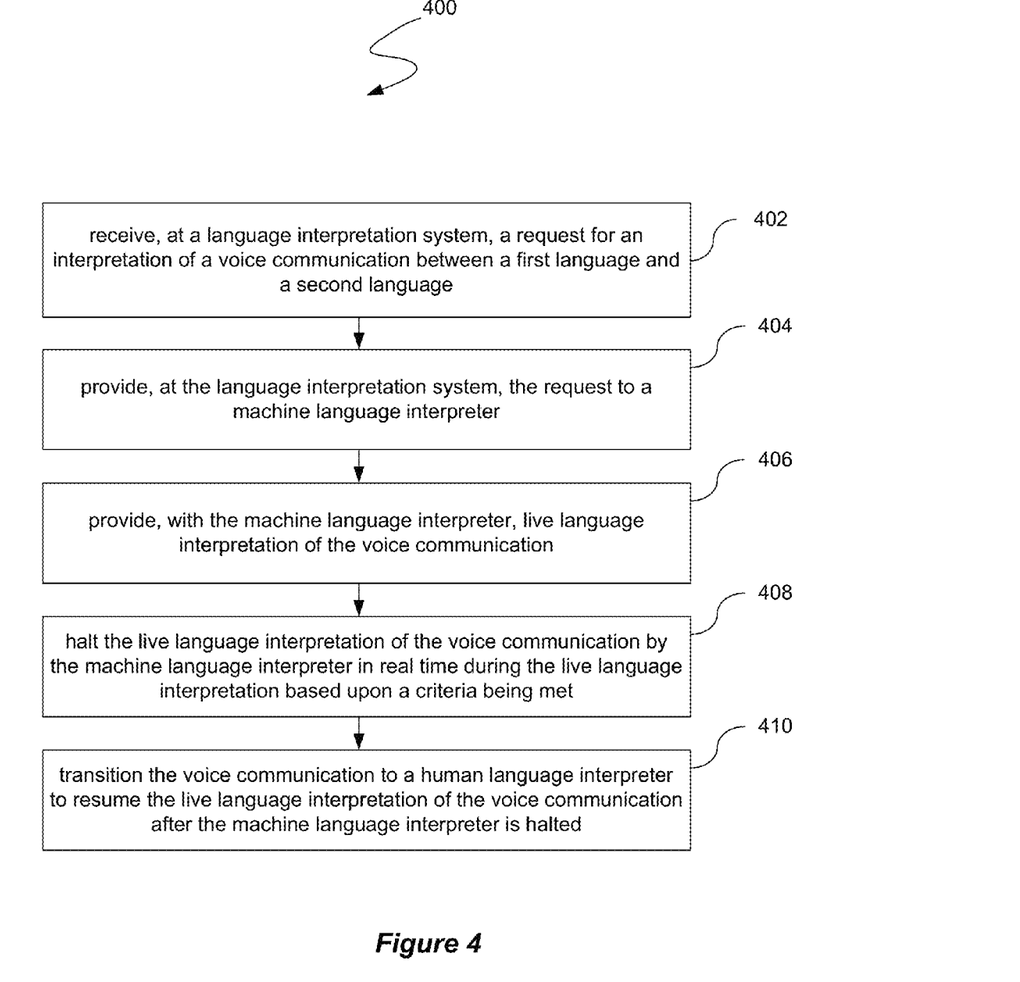
FIG. 4 illustrates a process that provides a transition from a machine language interpreter to a human language interpreter.

FIG. 4 illustrates a process 400 that provides a transition from a machine language interpreter to a human language interpreter. At a process block 402, the process 400 receives, at a language interpretation system, a request for an interpretation of a voice communication between a first language and a second language. Further, at a process block 404, the process 400 provides, at the language interpretation system, the request to a machine language interpreter. In addition, at a process block 406, the process 400 provides, with the machine language interpreter, live language interpretation of the voice communication. At a process block 408, the process 400 also halts the live language interpretation of the voice communication by the machine language interpreter in real time during the live language interpretation based upon a criteria being met. Further, at a process block 410, the process 400 transitions the voice communication to a human language interpreter to resume the live language interpretation of the voice communication after the machine language interpreter is halted.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of storing those instructions and include a CD-ROM, DVD, magnetic or other optical disc, tape, silicon memory, e.g., removable, non-removable, volatile or non-volatile, etc.

A computer is herein intended to include any device that has a general, multi-purpose or single purpose processor as described above. For example, a computer may be a set top box, cell phone, smart phone, tablet device, portable media player, video player, or the like.

Figure 5:
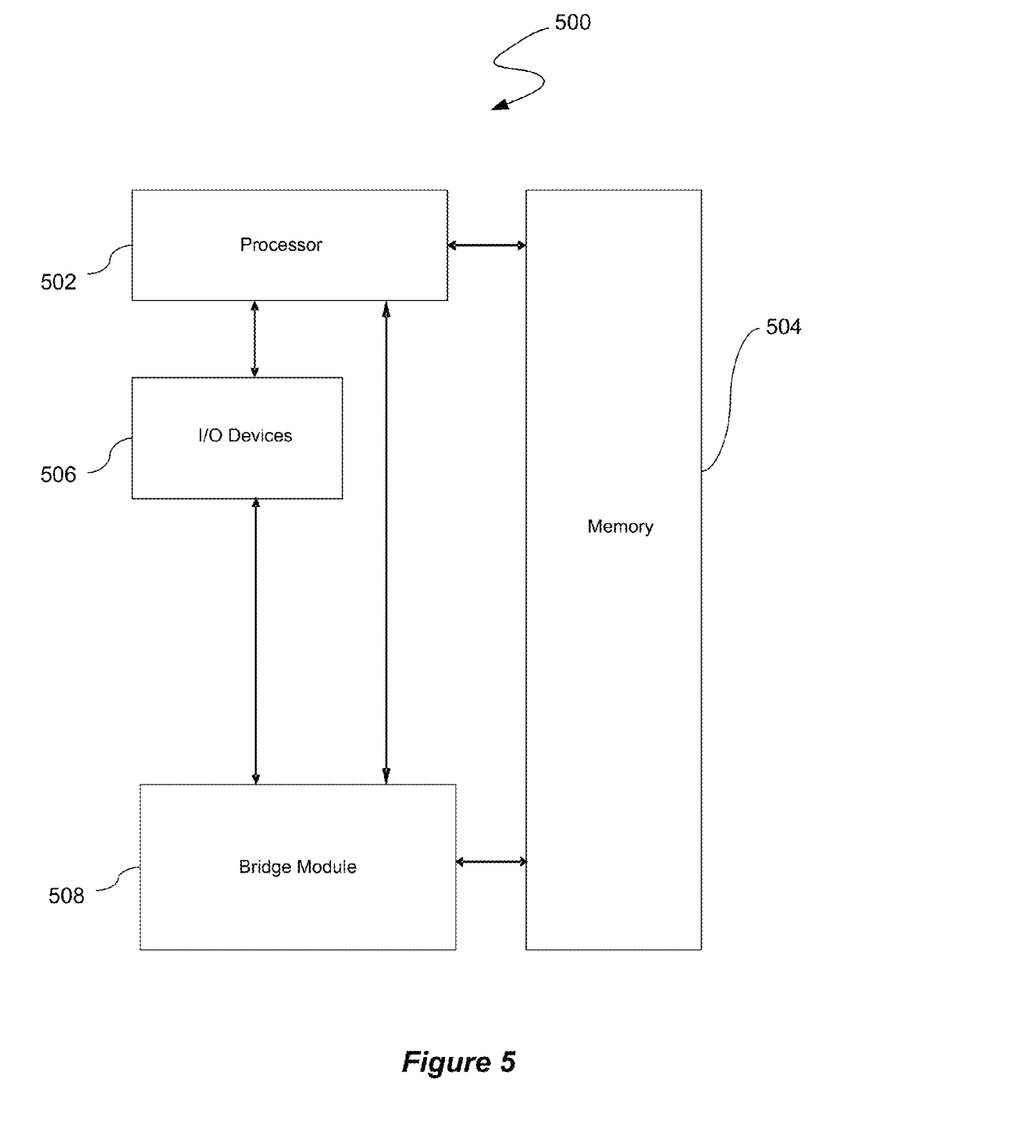
FIG. 5 illustrates a block diagram of a system that provides a bridge from machine language interpretation to human language interpretation.

FIG. 5 illustrates a block diagram of a system 500 that provides a bridge from machine language interpretation to human language interpretation. In one embodiment, the system 500 is implemented utilizing a general purpose computer or any other hardware equivalents. Thus, the system 500 comprises a processor 502, a memory 504, e.g., random access memory ("RAM") and/or read only memory (ROM), various input/output devices 506, (e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)), and a bridge module 508.

It should be understood that the bridge module 508 may be implemented as one or more physical devices that are coupled to the processor 502. Alternatively, the bridge module 508 may be represented by one or more software applications (or even a combination of software and hardware, e.g., using application specific integrated circuits (ASIC)), where the software is loaded from a storage medium, (e.g., a magnetic or optical drive, diskette, or non-volatile memory) and operated by the processor 502 in the memory 504 of the computer. As such, the bridge module 508 (including associated data structures) of the present disclosure may be stored on a computer readable medium, e.g., RAM memory, magnetic or optical drive or diskette and the like. The system 500 may be utilized for a hardware implementation of any of the configurations provided herein.

It is understood that the computer program products, apparatuses, systems, and processes described herein may also be applied in other types of apparatuses, systems, and processes. Those skilled in the art will appreciate that the various adaptations and modifications of the embodiments of the apparatuses, systems, and processes described herein may be configured without departing from the scope and spirit of the present computer program products, apparatuses, systems, and processes. Therefore, it is to be understood that, within the scope of the appended claims, the present computer program products, apparatuses, systems, and processes may be practiced other than as specifically described herein.

I claim:

1. A method comprising:

receiving, at a language interpretation system, a request for an interpretation of a voice communication between a first language and a second language;

assigning, at the language interpretation system, the request to a machine spoken language interpreter prior to a human spoken language interpretation;

providing, with a processor at the machine spoken language interpreter, live language interpretation of the voice communication;

halting, with the processor, the live language interpretation of the voice communication by the machine spoken language interpreter in real time during the live language interpretation prior to completion of the live language interpretation based upon a criterion being met without the machine spoken language interpreter completing the assigned request, the criterion being an assessment performed by the machine spoken language interpreter that a user that receives the live language interpretation is not content with the live language interpretation being performed by the machine spoken language interpreter, the criterion being met without receipt of a request by the user for routing the live language interpretation to a human spoken language interpreter, the assessment being performed during the live language interpretation;

transitioning the voice communication to the human spoken language interpreter to resume the live language interpretation of the voice communication without the machine spoken language interpreter after the machine spoken language interpreter is halted; and providing, from the machine spoken language interpreter to the human spoken language interpreter, data associated with the live language interpretation of the voice communication performed by the machine spoken language interpreter,
wherein the assessment is based on a predetermined threshold being exceeded during the live language interpretation, and wherein the assessment is based upon a quantity of user inputs received from the user during a current live language interpretation session surpassing the predetermined threshold.

2. The method of claim 1, wherein the criterion includes receipt of a fee.

3. The method of claim 1, wherein the data is the live language interpretation performed prior to the transitioning.

4. The method of claim 1, wherein the data is information obtained about a customer by the machine spoken language interpreter.

5. A computer program product comprising a computer readable storage device having a computer readable program stored thereon, wherein the computer readable program when executed on a computer causes the computer to:
    receive, at a language interpretation system, a request for an interpretation of a voice communication between a first language and a second language;
    assign, at the language interpretation system, the request to a machine spoken language interpreter prior to a human spoken language interpretation;
    provide, with the machine spoken language interpreter, live language interpretation of the voice communication;
    halt the live language interpretation of the voice communication by the machine spoken language interpreter in real time during the live language interpretation prior to completion of the live language interpretation based upon a criterion being met without the machine spoken language interpreter completing the assigned request, the criterion being an assessment performed by the machine spoken language interpreter that a user that receives the live language interpretation is not content with the live language interpretation being performed by the machine spoken language interpreter, the criterion being met without receipt of a request by the user for routing the live language interpretation to a human spoken language interpreter, the assessment being performed during the live language interpretation;
    transition the voice communication to the human spoken language interpreter to resume the live language interpretation of the voice communication without the machine spoken language interpreter after the machine spoken language interpreter is halted; and
    provide, from the machine spoken language interpreter to the human spoken language interpreter, data associated with the live language interpretation of the voice communication performed by the machine spoken language interpreter,
    wherein the assessment is based on a predetermined threshold being exceeded during the live language interpretation, and wherein the assessment is based upon a quantity of user inputs received from the user during a current live language interpretation session surpassing the predetermined threshold.

6. The computer program product of claim 5, wherein the criterion includes receipt of a fee.

7. A system comprising:
    a reception module that receives a request for an interpretation of a voice communication between a first language and a second language;
    a routing module;
    a machine spoken language interpreter that is assigned the request from the routing module prior to a human spoken language interpretation and provides live language interpretation of the voice communication; and
    a processor that halts the live language interpretation of the voice communication by the machine spoken language interpreter in real time during the live language interpretation prior to completion of the live language interpretation based upon a criterion being met without the machine spoken language interpreter completing the assigned request and transitions the voice communication to a human spoken language interpreter to resume the live language interpretation of the voice communication without the machine spoken language interpreter after the machine spoken language interpreter is halted, the criterion being an assessment performed by the machine spoken language interpreter that a user that receives the live language interpretation is not content with the live language interpretation being performed by the machine spoken language interpreter, the criterion being met without receipt of a request by the user for routing the live language interpretation to a human spoken language interpreter, the assessment being performed during the live language interpretation,
    wherein the assessment is based on a predetermined threshold being exceeded during the live language interpretation, and wherein the assessment is based upon a quantity of user inputs received from the user during a current live language interpretation session surpassing the predetermined threshold.

8. The system of claim 7, wherein the reception module receives the request through a network.

* * * * *